United States Patent [19]

Mochizuki et al.

[11] Patent Number: 4,683,769

[45] Date of Patent: Aug. 4, 1987

[54] RACK GUIDE IN RACK-AND-PINION TYPE STEERING GEAR

[75] Inventors: Hiroyuki Mochizuki; Nobuo Kobayashi; Yutaka Inuzuka; Shigeo Aiba; Setsuo Nishi, all of Toyota, Japan

[73] Assignee: Toyota Jidosha Kabushiki Kaisha, Aichi, Japan

[21] Appl. No.: 755,469

[22] Filed: Jul. 16, 1985

[30] Foreign Application Priority Data

Jul. 20, 1984 [JP]   Japan ............................ 59-110591[U]

[51] Int. Cl.⁴ .............................................. B62D 3/12
[52] U.S. Cl. ........................................ 74/422; 74/498
[58] Field of Search ................................. 74/422, 498

[56] References Cited

U.S. PATENT DOCUMENTS

| 3,572,158 | 3/1971 | Adams | 74/422 |
| 3,747,429 | 7/1973 | Cass | 74/422 |
| 3,844,181 | 10/1974 | Bayle | 74/498 |

FOREIGN PATENT DOCUMENTS

| 106367 | 6/1984 | Japan | 74/498 |
| 1235458 | 6/1971 | United Kingdom | 74/498 |

Primary Examiner—Allan D. Herrmann
Attorney, Agent, or Firm—Parkhurst & Oliff

[57] ABSTRACT

A synthetic resin rack guide in a rack-and-pinion type steering gear is provided with a projection formed on an outer peripheral surface at an end portion which is in contact with a rack bar. The projection is designed in such a manner that a diameter thereof after shrinkage due to annealing is equal to or slightly larger than an inner diameter of a guide hole for receiving the rack guide. With this arrangement, an abnormal noise created between rack teeth and a pinion may be prevented.

2 Claims, 4 Drawing Figures

RACK GUIDE IN RACK-AND-PINION TYPE STEERING GEAR

BACKGROUND OF THE INVENTION (1) Field of the Invention

This invention relates to a rack guide in a rack-and-pinion type steering gear for an automobile and the like, and more particularly to a rack guide designed to prevent an abnormal noise created between rack teeth and a pinion.

(2) Description of the Prior Art

As shown in FIGS. 3 and 4, a rack-and-pinion type steering gear includes a rack bar 1 arranged in a lateral direction of a vehicle, a pinion 2 provided at an end of a steering shaft (not shown) and meshed with the rack bar 1, and link rods 3 mounted at both ends of the rack bar 1. The line rods 3 are adapted to move the direction of right and left knuckle arms (not shown) of both wheels thereby to effect a steering operation. The rack bar 1 is supported by a rack guide 4 on a side thereof opposite to a meshed side of the pinion 2, while the rack guide 4 is prepressurized by a spring 5 and an adjustment screw 6 on an opposite side of the rack bar 1. Conventionally, the rack guide 4 is made mostly of synthetic resin. The following problems have not been solved.

Generally, synthetic resin moldings are annealed to allow uniform crystallization after demolding, and they tend to be shrunk during annealing. Such shrinkage occurs differently in dependence upon a product shape and a wall thickness distribution, etc. In the case of the rack guide 4 as mentioned above, the rack guide 4 is shrunk to form a frusto-conical shape. As a result, a clearance C is created between an inner circumferential surface 7a of a guide hole of a rack housing 7 and an outer circumferential surface 4a of the rack guide 4. As a result, during a rough road running of the vehicle, when an external force is randomly applied to the rack bar 1, the rack bar 1 receives a repulsive force from the pinion 2 based on a pressure angle and a lead angle of rack teeth 1a, and accordingly receives a motive force in an axial direction (as depicted by an arrow A) of the pinion 2. Such a motive force is also transmitted to the rack guide 4. As a result, the movement of the rack bar 1 in the axial direction of the pinion 2 may not be restricted by the frusto-conical rack guide 4 because of the presence of the clearance C as shown in FIG. 4, and there is created an abnormal metallic noise between the rack teeth 1a and the pinion 2. To reduce such an abnormal noise, the rack guide 4 is conventionally machined after annealing to form a columnar shape thereof which may be fitted to the inner circumferential surface 7a of the guide hole. Alternatively, the rack guide is molded in a die whose inner face is designed to make a columnar molding after the shrinkage due to annealing. However, die face matching of such a die is difficult and increases the cost of the die.

SUMMARY OF THE INVENTION

Accordingly, it is an object of the present invention to provide a rack guide in a rack-and-pinion type steering gear which prevents abnormal noise between rack teeth and a pinion.

It is another object of the present invention to provide a rack guide in a rack-and-pinion type steering gear which may be formed without being machined after annealing, and which may be reduced in cost.

According to the present invention, there is provided a synthetic resin rack guide in a rack-and-pinion type steering gear comprising a projection formed on an outer peripheral surface at an end portion on a contact side of a rack bar. A diameter of the projection in the die is larger than the inner diameter of the guide hole 7a by an amount of the shrinkage due to annealing of the rack guide, while the diameter of the projection after shrinkage due to annealing is rendered identical with or slightly larger than the inner diameter of the guide hole 7a.

Various general and specific objects, advantages and aspects of the invention will become apparent when reference is made to the following detailed description of the invention considered in conjunction with the related accompanying drawings.

DETAILED DESCRIPTION OF THE PREFERRED EMBODIMENT

Figure 1:
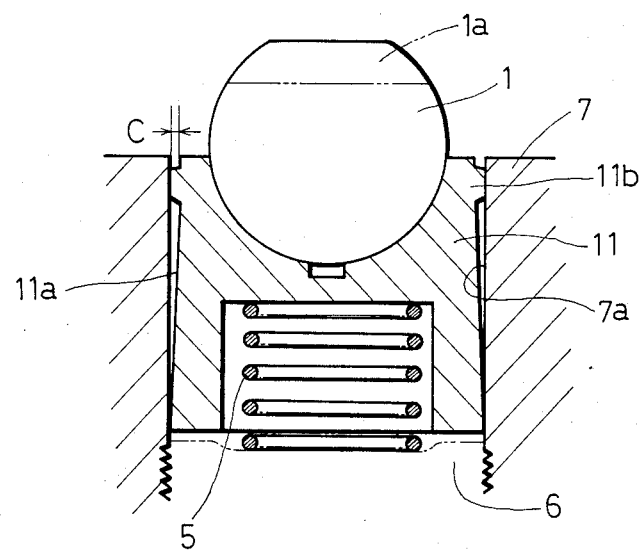
FIG. 1 is a vertical sectional view of a preferred embodiment according to the present invention.
Figure 2:
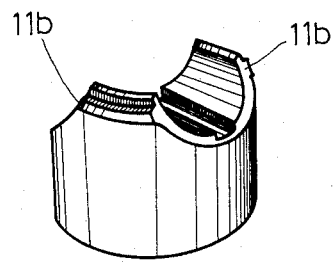
FIG. 2 is a perspective view of a part of the preferred embodiment.
Figure 3:
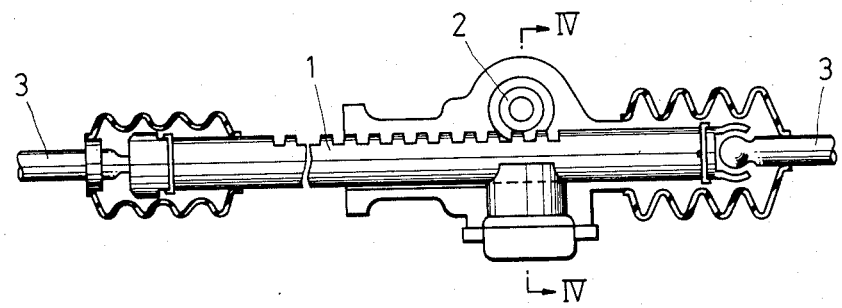
FIG. 3 is an elevational view of a conventional rack-and-pinion type steering gear.
Figure 4:
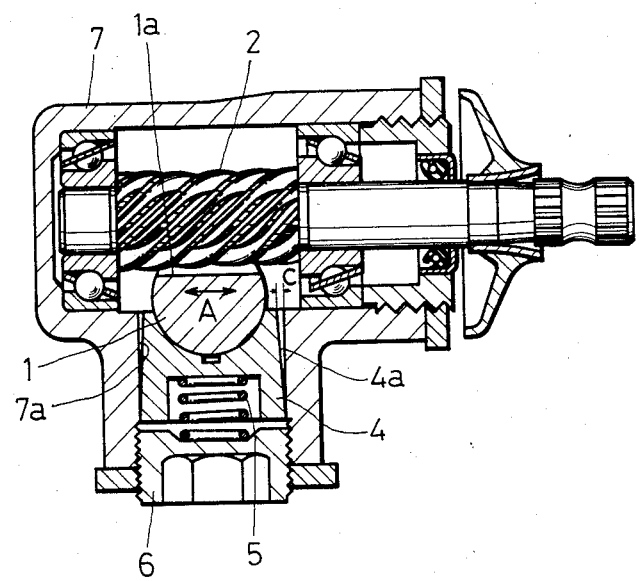
FIG. 4 is a cross-section taken along the line IV—IV in FIG. 3.

Referring to FIGS. 1 and 2, the same reference numbers as in FIGS. 3 and 4 indicate the same members. The rack teeth 1a of the rack bar 1 are meshed with a pinion (not shown), and the rack bar 1 is slidably supported by the rack guide 11 on a side thereof opposite to a meshed side of the rack teeth 1a. The rack guide 11 is inserted in the guide hole 7a of the rack housing 7, and is biased against the rack bar 1 by the spring 5 and the adjustment screw 6. The rack guide 11 is made of synthetic resin materials having a low coefficient of friction. The rack guide 11 is provided with a projection 11b projecting from an outer peripheral surface 11a at an end portion on a contact side of the rack bar 1. An outer diameter of the projection 11b is designed to be identical with or slightly larger than an inner diameter of the guide hole 7a after shrinkage due to annealing. In the case that the diameter of the projection is slighty larger than that of the guide hole, the diameter is designed into such that the rack guide may be press-fitted into the guide hole.

The projection 11b may be easily formed by providing a channel for forming the projection at an inner peripheral portion of a die (not shown) for molding the rack guide 11. The depth of the channel is equal to half an amount of decrease in the diameter of the rack guide due to annealing.

The outer circumferential surface 11a of the synthetic resin rack guide 11 is formed in a frusto-conical shape owing to annealing after demolding thereby to create the clearance C between the outer peripheral surface at the upper end portion of the rack guide 11 and the guide hole 7a. The clearance C is filled with the projection 11b. Accordingly, the movement of the rack guide 11 in this invention due to a repulsive force received from the rack bar 1 may be restricted to prevent an abnormal noise created between the rack teeth 1a and the pinion.

Having thus described the preferred embodiment of the invention it should be understood that numerous structural modifications and adaptations may be resorted to without departing from the spirit of the invention.

What is claimed is:

1. A synthetic resin rack guide in a rack-and-pinion type steering gear comprising an arcuate projection formed on an outer peripheral surface of said rack guide at an end portion thereof which is in contact with a rack bar, wherein said arcuate projection projects by an amount corresponding to an amount of rack guide shrinkage which occurs after demolding of said rack guide, so that a diameter of said projection after said shrinkage is equal to or slightly larger than an inner diameter of a guide hole for receiving said rack guide.

2. The synthetic resin rack guide as defined in claim 1, wherein said diameter of said projection is larger than the inner diameter of said guide hole and said rack guide is press-fitted into said guide hole.

* * * * *